United States Patent Office 2,988,895
Patented June 20, 1961

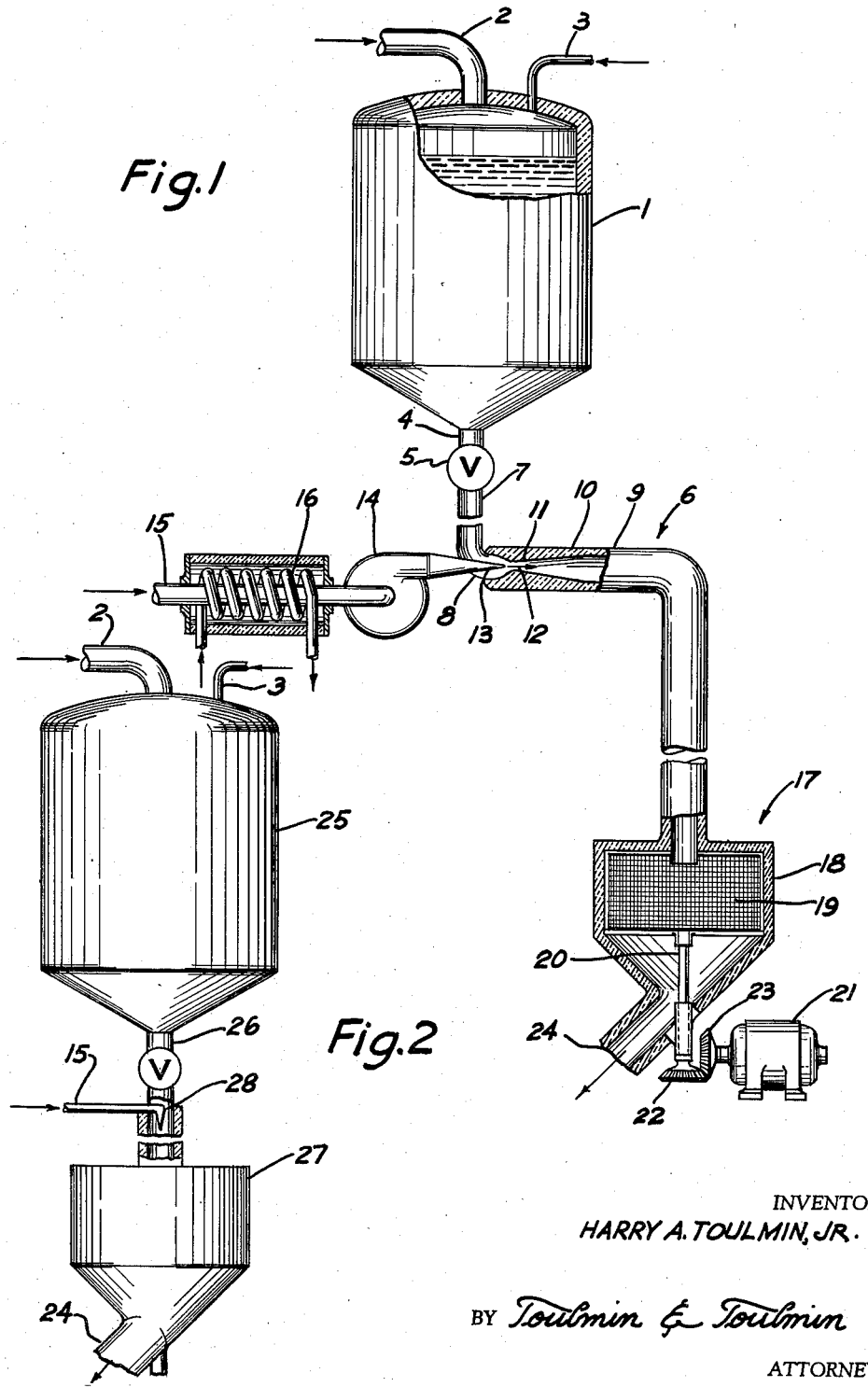

2,988,895
PROCESS FOR LOW TEMPERATURE DEHYDRATION
Harry A. Toulmin, Jr., Dayton, Ohio, assignor, by mesne assignments, to Union Carbide Corporation, New York, N.Y., a corporation of New York
Filed June 19, 1959, Ser. No. 821,516
5 Claims. (Cl. 62—58)

The present invention relates to an apparatus and method for the concentration of aqueous heat-sensitive materials by low temperature dehydration, more particularly to the concentration of citrus juices and the like by removing the water therefrom in the form of ice crystals by introducing a jet of inert gas into a stream of flowing citrus juice at a sufficiently low temperature to freeze the water into ice crystals.

In low temperature dehydration processes with respect to citrus juices and the like, it is desired that these processes be as simple and as economical as possible. One way in which the cost of such a process can be lowered is by providing a continuous flow process. In a continuous flow process, however, it is necessary that the equipment be simple in construction so as not to require excessive maintenance or attention during operation of the apparatus.

Present arrangements for reducing the temperature of citrus juices and the like sufficiently to freeze the water therein into ice crystals require rather complex structure. Thus, attention has been given to providing new and improved methods and apparatus for effectively lowering the temperature of a citrus juice or the like so as to freeze the water therein into ice crystals.

In the present invention the citrus juice is flowed through a conduit, and a jet of inert gas maintained at a low temperature is introduced into the conduit in the direction of flow of the juice. This cold gas acts as a refrigerating agent and will cause the freezing of water in the juice into the form of ice crystals. The resulting ice crystals and the partially dehydrated citrus juice are then conveyed to a centrifuge where the ice crystals are separated from the juice and discarded. The partially dehydrated juice may then be passed to storage for subsequent packaging, or can be passed through another freezing step so as to increase the concentration of the juice.

While the present invention is directed to citrus juice, it is to be understood that it can also be applied to the concentration of fruit and vegetable juices, beer, wines, various drugs and chemicals, and any other liquids wherein the principal constituent is water.

It is therefore the principal object of this invention to provide a novel and improved method and apparatus for the concentration of citrus juice and the like by low temperature dehydration.

It is another object of this invention to provide a method and apparatus for the continuous concentration of aqueous heat-sensitive materials containing solids by low temperature dehydration.

It is a further object of this invention to provide a method and apparatus for the concentration of citrus juices and the like by introducing a jet of low temperature inert gas into the liquid as it is flowing in a conduit.

Other objects and advantages of this invention will become apparent upon reference to the accompanying description when taken in conjunction with the following drawings, wherein:

FIGURE 1 is a side elevational view of the apparatus of this invention with portions thereof being shown in section so as to more clearly illustrate details of the construction; and FIGURE 2 is an elevational view of a modification of the invention as illustrated in FIGURE 1.

Returning now to the drawings, wherein like reference symbols indicate the same parts throughout the various views, in FIGURE 1 there is shown a tank 1 wherein the citrus juice is stored. The tank has an inlet 2 in the top thereof through which juices are admitted into the tank. Also in the top of the tank is a connection 3 which leads to a source of inert gas. The source of inert gas, such as nitrogen, is maintained at a pressure of several atmospheres and at a temperature which is substantially equal to that of the juice stored in the tank 1. The temperature of this gas may be lower than the temperature of the juice, so that a precooling of the juice will result when the gas is discharged into the tank 1.

The tank has an outlet 4 in the bottom thereof, with a valve 5 for regulating the flow of liquid therethrough. Connected to the outlet is a conduit 6 having a vertical portion 7 which is connected through an elbow 8 to a substantially horizontal portion 9. The horizontal portion is insulated by a layer of insulating material 10 and has a venturi 11 therein adjacent the elbow 8. The venturi is conventional in structure and comprises a throat 12.

Positioned in the throat of the venturi is a jet 13 which is connected to the discharge side of a pump 14. The pump 14 has its intake connected to a supply of inert gas such as nitrogen, carbon dioxide, helium or argon. The gas is introduced into the pump 14 through an inlet line 15 which passes through cooling coils 16 through which a refrigerant is circulated at a sufficiently low temperature to cool the inert gas to a temperature of about −10° F.

The horizontal portion 9 of the conduit 6 is then connected to a centrifuge 17 which has a layer of insulation 18 thereon. The centrifuge has a basket 19 having perforated side walls and is mounted upon a shaft 20 journalled in the bottom of the centrifuge and connected to a driving motor 21 through bevel gears 22 and 23. There is a drain 24 at the bottom of the centrifuge for removing the juice from the centrifuge after it has been separated from the ice crystals. The ice crystals are retained in the basket, and the centrifuge is provided with the usual structure for removing the ice crystals therefrom.

A second centrifuge may also be provided so as to separate the ice crystals from the partially dehydrated juice when the ice crystals are being removed from the other centrifuge. This will enable the concentrating process to be carried on continuously.

In place of the centrifuge 17, a centrifuge may be used wherein the ice crystals in the basket are continuously being removed therefrom as they are retained in the basket.

In FIGURE 2 there is illustrated a modification of the apparatus shown in FIGURE 1. This modification similarly comprises a tank 25 for the storage of the juice and has the inlet and gas connections on the top thereof as described above. Leading downwardly from the bottom of the tank 25 is a vertical conduit 26 which leads to a centrifuge 27.

Positioned in the vertical conduit is a jet 28 which is directed in the direction of flow of the juice through the vertical conduit. The jet 28 is connected to a source of low temperature inert gas similar to that described above. Thus, in this modification, the venturi is not used, but the cold inert gas is discharged into the stream of citrus juice as it flows past the jet. Upon the formation of ice crystals in this flowing juice, the slushy mass comprising the ice crystals and partially dehydrated juice are then conveyed to a centrifuge, where they are processed as described above.

In carrying out the method of this invention, the citrus juice stored in the tank 1 is flowed through the conduit 6 upon opening of the valve 5. This flow may either be by gravity or may be a pressure flow induced by maintaining the interior of the tank at a pressure of several atmospheres. This pressure is achieved by introducing the inert gas through the connection 3 wherein the gas will accumulate in the head space of the tank and will cause the juice to flow under pressure through the conduit.

As the juice is flowed through the venturi, whose axis is maintained at substantially the horizontal, a blast or jet of nitrogen maintained at a temperature of −10° F. is directed into the throat of the venturi into the flowing juice in the direction thereof. It is to be understood that other temperatures of nitrogen may be used in this process. It is required, however, that the nitrogen be maintained at a sufficiently low temperature so as to freeze the water in the citrus juice into the form of ice crystals. The citrus juice used in this process is 12% solids orange juice which has an initial ice-forming point of 28° F.

As ice crystals are formed in the horizontal portion of the conduit by the refrigerating action of the cold nitrogen, a slushy mass will be formed comprising the ice crystals and the partially dehydrated citrus juice. This slushy mass is then conveyed into a centrifuge where the juice concentrate is separated from the ice crystals and is then drained off to storage or to be recirculated through an additional freezing process so as to remove more water therefrom and increase the concentration of the juice. The ice crystals are retained in the basket and periodically discarded in the usual manner.

Substantially the same process is performed with the modification as shown in FIGURE 2. In the modified process, the cold nitrogen is introduced directly into the flow of citrus juice as the juice passes through the conduit, and no venturi or any other flow-restricting structure is used.

The nitrogen may also be separated from the citrus juice in the centrifuge and may be circulated through a scrubber so that the nitrogen may be reused in the freezing process.

The nitrogen removed from the centrifuge may also be used in a process of canning the frozen citrus juice, since the presence of nitrogen in sealed packages of citrus juice and other foods increases the shelf life of the packaged goods and enables the goods to retain a fresh taste.

Thus it can be seen that the present invention discloses a simple but effective apparatus and process for freeze concentration of citrus juice and other liquids containing solids and wherein the primary constituent is water. Moreover, the process of this invention is continuous and may be carried out by gravity flow without the necessity for introducing a pressure flow of the juice throughout the system. By freezing the water into ice crystals as the juice is moving, very little, if any, of the solids in the juice will be occluded in the ice crystals. Thus, the taste of the reconstituted juice made from the frozen concentrate will be substantially that of fresh juice.

It will be understood that this invention is susceptible to modification in order to adapt it to different usages and conditions, and, accordingly, it is desired to comprehend such modifications within this invention as may fall within the scope of the appended claims.

What I claim is:

1. In an apparatus for concentrating citrus juice by low temperature dehydration, a tank for containing the citrus juice, a conduit connected to said tank and having a horizontal portion therein to enable the juice to flow through said conduit, a venturi tube in the horizontal portion of said conduit, a supply of inert refrigerant gas maintained at a temperature of approximately −10° F. and sufficiently low to freeze the water in the citrus juice into ice crystals, a jet in the throat of said venturi and connected to said supply of inert refrigerant gas, means comprising a centrifuge connected to said venturi tube and adapted to separate the ice crystals from the partially dehydrated citrus juice, and means for recovering said inert refrigerant gas for re-use.

2. In an apparatus for concentrating citrus juice by low temperature dehydration, a tank for containing the citrus juice, a conduit connected to said tank for flowing of the juice therethrough, a venturi tube connected to said conduit, a supply of nitrogen gas maintained at a temperature of approximately −10° F. and sufficiently low to freeze the water in the citrus juice into the form of ice crystals, a jet positioned within said venturi tube and connected to said supply of nitrogen gas, means connected to said conduit for separating the ice crystals from the partially dehydrated citrus juice, and means for separating and recovering said nitrogen gas.

3. In an apparatus for concentrating citrus juice by low temperature dehydration, a tank for containing the citrus juice, a conduit connected to said tank and having a horizontal portion therein to enable the juice to flow through said conduit, a venturi tube in the horizontal portion of said conduit, a supply of nitrogen gas maintained at a temperature of approximately −10° F. and sufficiently low to freeze the water in the citrus juice into ice crystals, a jet in the throat of said venturi tube and connected to said supply of nitrogen gas, said jet being positioned so as to discharge in the direction of flow of the citrus juice through said venturi tube, means to separate the ice crystals from the partially dehydrated citrus juice, and means comprising a scrubber through which said nitrogen gas is circulated for recovery of the nitrogen gas after passing through said centrifuge.

4. In a method of concentrating citrus juice by low temperature dehydration, the steps of flowing the citrus juice from storage through a venturi tube, concurrently discharging a jet of nitrogen maintained at a temperature approximately −10° F. into the throat of the venturi in the direction of flow of the citrus juice therethrough whereby the water in the citrus juice is frozen into ice crystals, and thereafter separating the ice crystals from the partially dehydrated citrus juice.

5. In a method of concentrating citrus juice by low temperature freezing out of the water constituent, the improvement of carrying out the freezing of the citrus juice by passing the same through a venturi tube while concurrently introducing thereinto a jet of refrigerant inert gas, said gas being at a temperature approximating −10° F. and whereby the juice is subjected to a temperature to cause water in the citrus juice to be frozen out as ice crystals, and thereafter passing the slushy mass of ice crystals and mother citrus juice into a chamber and separating said ice crystals from the mother juice to recover a substantially concentrated citrus juice.

References Cited in the file of this patent

UNITED STATES PATENTS

| | | |
|---|---|---|
| 1,976,204 | Voorhees et al. | Oct. 9, 1934 |
| 2,020,719 | Bottoms | Nov. 12, 1935 |
| 2,300,642 | Booth | Nov. 3, 1942 |
| 2,821,304 | Zarchin | Jan. 28, 1958 |
| 2,859,596 | Evans | Nov. 11, 1958 |